(12) United States Patent
Lee et al.

(10) Patent No.: US 11,843,487 B2
(45) Date of Patent: Dec. 12, 2023

(54) HIGH PERFORMANCE RECEIVERS FOR MOBILE INDUSTRY PROCESSOR INTERFACES (MIPI) AND METHODS OF OPERATING SAME

(71) Applicant: Samsung Electronics Co., Ltd., Suwon-si (KR)

(72) Inventors: Seongkwan Lee, Yongin-si (KR); Minho Kang, Seoul (KR); Cheolmin Park, Gumi-si (KR)

(73) Assignee: Samsung Electronics Co., Ltd.

( * ) Notice: Subject to any disclaimer, the term of this patent is extended or adjusted under 35 U.S.C. 154(b) by 55 days.

(21) Appl. No.: 17/368,459

(22) Filed: Jul. 6, 2021

(65) Prior Publication Data
US 2022/0060358 A1 Feb. 24, 2022

(30) Foreign Application Priority Data

Aug. 19, 2020 (KR) .................. 10-2020-0103889

(51) Int. Cl.
*H04L 25/49* (2006.01)
*H04N 5/06* (2006.01)
*G09G 3/20* (2006.01)

(52) U.S. Cl.
CPC ....... *H04L 25/4917* (2013.01); *G09G 3/2096* (2013.01); *H04N 5/06* (2013.01)

(58) Field of Classification Search
CPC ..... H04L 25/4917; G09G 3/2096; H04N 5/06
See application file for complete search history.

(56) References Cited

U.S. PATENT DOCUMENTS

| | | | | |
|---|---|---|---|---|
| 4,388,731 A * | 6/1983 | King | ............ | H03G 3/344 455/221 |
| 5,164,864 A * | 11/1992 | Perroud | ............ | H04N 5/931 386/E5.028 |
| 8,284,848 B2 | 10/2012 | Nam et al. | | |
| 9,755,818 B2 | 9/2017 | Sengoku | | |
| 10,027,504 B2 | 7/2018 | Wiley | | |
| 10,374,845 B1 | 8/2019 | Ji et al. | | |
| 10,454,725 B1 * | 10/2019 | Lee | ............ | H04L 25/4917 |
| 10,554,234 B2 | 2/2020 | Shimada et al. | | |
| 2013/0195155 A1 * | 8/2013 | Pan | ............ | H03D 1/00 375/317 |
| 2019/0222059 A1 * | 7/2019 | Hayashi | ............ | H04L 25/0264 |

OTHER PUBLICATIONS

English Translation of IT 1225551 (Year: 1980).*
English Translation of JP H11127203 (Year: 1999).*

* cited by examiner

*Primary Examiner* — Patrick N Edouard
*Assistant Examiner* — Eboni N Giles
(74) *Attorney, Agent, or Firm* — Myers Bigel, P.A.

(57) ABSTRACT

A receiver, which is compatible with a mobile industry processor interface (MIPI) C-PHY physical layer, includes a plurality of variable-gain amplifiers responsive to respective multi-level signals (e.g., 3-level signals), and a plurality of filters having variable cutoff frequencies. The plurality of filters are responsive to respective signals generated by the plurality of amplifiers. An array of comparators is provided, which is responsive to signals generated by the plurality of filters. A jitter detection circuit is provided, which is configured to set respective gains of the plurality of variable-gain amplifiers and respective cutoff frequencies of the plurality of filters (e.g., high-pass filters), in response to signals generated by the array of comparators.

5 Claims, 12 Drawing Sheets

| INA | INB | INC | INA>INB | INB>INC | INC>INA | WIRE STATE NAME |
|---|---|---|---|---|---|---|
| HIGH | LOW | MID | 1 | 0 | 0 | +X |
| LOW | HIGH | MID | 0 | 1 | 1 | -X |
| MID | HIGH | LOW | 0 | 1 | 0 | +Y |
| MID | LOW | HIGH | 1 | 0 | 1 | -Y |
| LOW | MID | HIGH | 0 | 0 | 1 | +Z |
| HIGH | MID | LOW | 1 | 1 | 0 | -Z |

HIGH PERFORMANCE RECEIVERS FOR MOBILE INDUSTRY PROCESSOR INTERFACES (MIPI) AND METHODS OF OPERATING SAME

REFERENCE TO PRIORITY APPLICATION

This U.S. non-provisional application claims priority under 35 USC § 119 to Korean Patent Application No. 10-2020-0103889, filed Aug. 19, 2020, the disclosure of which is hereby incorporated herein by reference.

BACKGROUND

1. Technical Field

Example embodiments relate generally to semiconductor integrated circuits, and more particularly, to receiving circuits, receiving devices and interface circuits having the receiving circuits therein.

2. Discussion of the Related Art

Complementary metal oxide semiconductor (CMOS) image sensors (CIS) are widely used in modern mobile devices. A CMOS image sensor may be coupled to the mobile device to communicate with an application processor (AP) of the mobile device using a C-PHY interface. The C-PHY interface was standardized in 2014 for interfacing with a camera or a display as one of the physical layers within a mobile industry processor interface (MIPI). After the CMOS image sensor is manufactured, a test process is performed on the CMOS image sensor before being coupled to the mobile device. In the test process, a test device provides test input signals to the CMOS image sensor, and the CMOS image sensor outputs test output signals based on the test input signal. The test output signals may be transmitted to the test device using the C-PHY interface to resemble an environment after the CMOS image sensor is coupled to the mobile device. However, in the test process, a distance between the CMOS image sensor and the test device is considerably longer than a distance between the CMOS image sensor and an AP of the mobile device when the CMOS image sensor is coupled to the mobile device. Accordingly, the test process operations may not closely replicate the field operations of the mobile device.

SUMMARY

Some example embodiments may provide a receiving circuit, a receiving device and an interface circuit including the receiving circuit, capable of efficiently receiving test output signals and reducing manufacturing cost of the receiving circuit.

According to example embodiments, an interface circuit of a mobile industry processor interface (MPIP) C-PHY physical layer includes a receiving circuit. The receiving circuit includes an amplifying circuit, a filtering circuit and a branch circuit. The amplifying circuit receives a plurality of multi-level signals and amplifies the plurality of multi-level signals to generate a plurality of amplified signals. The filtering circuit filters the plurality of amplified signals to generate a plurality of filtering signals. The branch circuit branches each of the plurality of filtering signals to generate at least two of a plurality of branch signals.

According to example embodiments, a receiving device includes a printed circuit board and a receiving circuit. The receiving circuit is mounted on the printed circuit board. The printed circuit board includes a plurality of mounting areas, a plurality of channel patterns and a connector. The plurality of mounting areas include first to third mounting areas. The plurality of channel patterns include first to fifth channel patterns. The receiving circuit includes amplifiers, resistors, capacitors, high-speed mode comparators and low-power mode comparators. The amplifiers are formed in the first mounting area. The resistors and the capacitors are formed in the second mounting area. The high-speed mode comparators and the low-power mode comparators are formed in the third mounting area. The amplifiers are connected to the resistors and the capacitors through the first channel pattern. The resistors and the capacitors are connected to the high-speed mode comparators through the second channel pattern. The resistors and the capacitors are connected to the low-power mode comparators through the third channel pattern. The high-speed mode comparators and the low-power mode comparators are connected to the connector through the fourth channel pattern. The plurality of multi-level signals are input to the amplifiers through the fifth channel pattern.

According to example embodiments, an interface circuit includes a transmission line, a transmitting device and a receiving device. The transmitting device transmits a plurality of multi-level signals through the transmission line. The receiving device includes an amplifying circuit, a filtering circuit and a branch circuit. The amplifying circuit receives a plurality of multi-level signals and amplifies the plurality of multi-level signals to generate a plurality of amplified signals. The filtering circuit filters the plurality of amplified signals to generate a plurality of filtering signals. The branch circuit branches each of the plurality of filtering signals to generate two of a plurality of branch signals.

The receiving circuit, the receiving device and the interface circuit according to example embodiments reduces the loss of each of the test output signals received from the CMOS image sensor through the MIPI C-PHY interface circuit in a test environment in which the CMOS image sensor is tested as a device under test (DUT). Thus, the receiving circuit enables the test device to efficiently receive the test output signals. In addition, the receiving circuit may be mounted on a printed circuit board (PCB) rather than an application specific integrated circuit ASIC. Thus, it is possible to reduce manufacturing cost of the receiving circuit or the like.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Various example embodiments will be described more fully hereinafter with reference to the accompanying drawings, in which some example embodiments are shown. In the drawings, like numerals refer to like elements throughout. The repeated descriptions may be omitted.

Figure 1:
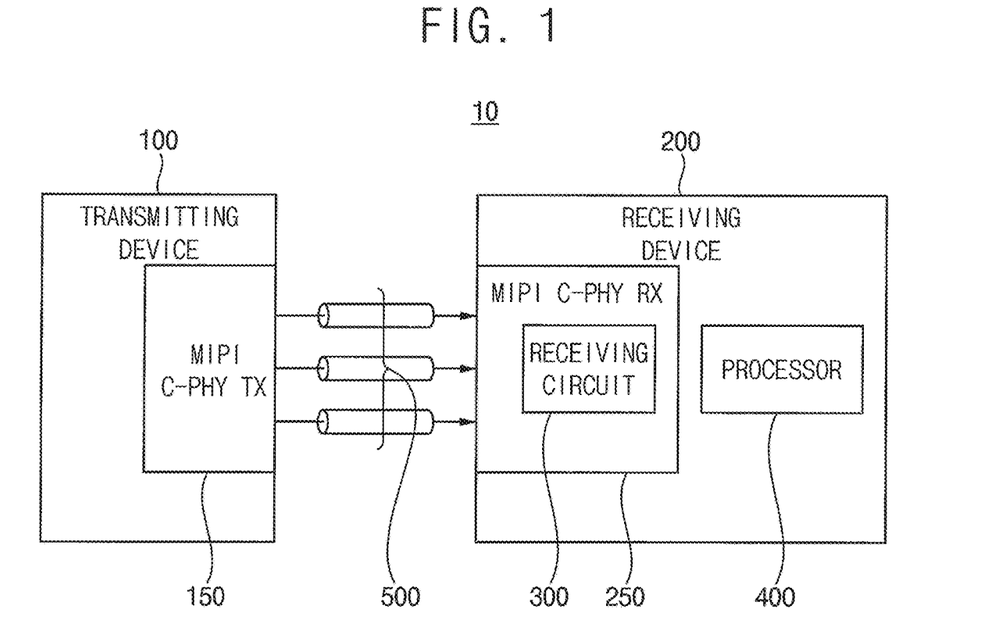
FIG. 1 is a block diagram illustrating an interface circuit according to example embodiments.

FIG. 1 is a block diagram illustrating an interface circuit according to example embodiments. Referring to FIG. 1, an interface circuit 10 may include a transmitting device 100, a receiving device 200 and a transmission line 500. The transmitting device 100 may include a transmitter 150, the receiving device 200 may include a receiver 250, and the receiver 250 may include a receiving circuit 300. The receiving device 200 may further include a processor 400.

In some embodiments, the interface circuit 10 may be applied to a test system capable of testing defects in operations of any manufactured electronic components. In this case, the transmitting device 100 may be a test board. For example, the transmitting device 100 may include a plurality of boards for testing a device under test (DUT). The DUT may be any integrated circuit (IC) and/or a semiconductor device. For example, the DUT may be one of a complementary metal oxide semiconductor (CMOS) image sensor (CIS), a system-on-chip (SoC) and an application processor (AP).

The receiving device 200 may be a test device. The receiving device 200 may provide test input signals to the transmitting device 100 under a control of the processor 400, and the transmitting device 100 may output test output signals based on the test input signals. The test output signals may be provided from the transmitting device 100 to the receiving device 200 through the transmission line 500. In this case, the interface circuit 10 connecting the transmitting device 100 and the receiving device 200 may be a mobile industry processor interface (MIPI) C-PHY interface circuit. The MIPI defines a standard for an interface that connects the AP of a mobile device and peripheral devices.

D-PHY, M-PHY and C-PHY are defined as physical layers of the MIPI. The D-PHY and the C-PHY are defined for an interface with a display or a camera, respectively, and the M-PHY is defined for an interface with a storage device or a RF component. The C-PHY was standardized by improving the D-PHY. In this case, the transmitter 150 may be a MIPI C-PHY transmitter, and the receiver 250 may be a MIPI C-PHY receiver. The transmission line 500 may include a plurality of lanes for providing a plurality of multi-level signals. Hereinafter, it will be described with respect to the C-PHY.

Figure 2:
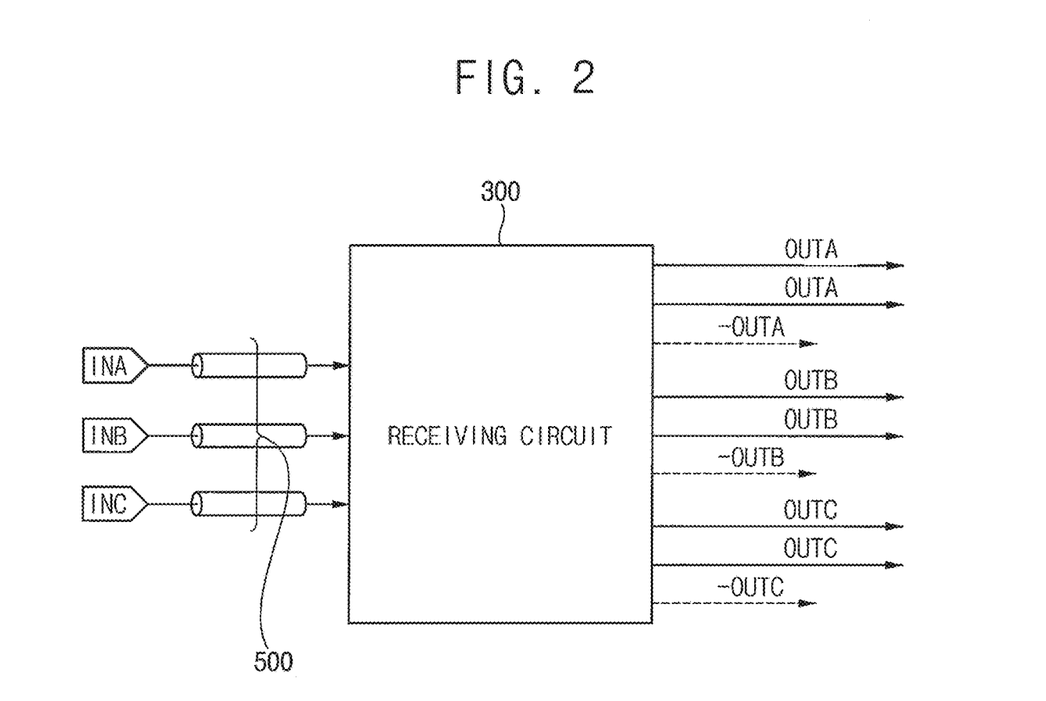
FIG. 2 is block diagram for describing a C-PHY interface according to a mobile industry processor interface (MIPI) standard.

FIG. 2 is block diagram for describing mobile industry processor interface (MIPI) C-PHY interface. Referring to FIG. 2, a MIPI C-PHY interface may include a receiving circuit 300. The receiving circuit 300 may receive test output signals through a plurality of lanes 500. The test output signals may be a plurality of multi-level signals INA, INB and INC. The plurality of lanes 500 may include a plurality of lines. For example, the plurality lanes 500 may include three lanes, and each of the three lanes may include three lines. C-PHY is distinguished from the D-PHY, which includes one clock lane and four data lanes, and each of the data lanes includes two lines.

Each of the plurality of lines included in each of the plurality of lanes 500 may transmit multi-level signals of 'HIGH', 'MID' and 'LOW' within INA, INB and INC. In theory, a total of twenty-seven types of signals may be provided through one data lane, however, only six types of signals may be used to generate difference signals OUTA, OUTB and OUTC based on the multi-level signals.

A maximum transmission rate of the test output signals received through each of the plurality of lanes 500 is 2.5 Gsps (i.e., 2.5 Gsym/sec). When the maximum transmission rate is converted into bit units, it becomes 5.7 Gbps (Gbit/sec), thus the maximum transmission rate of the test output signals received through all of the plurality of lanes 500 is 17.1 Gbps (Gbit/sec).

The test output signals are transmitted as the multi-level signals INA, INB and INC at a high speed of 17.1 Gbps. Thus, as the length of a transmission line (e.g., the plurality of lanes 500) increase, a loss of each of the test output signals may increase. However, as will be described later with reference to FIGS. 2 to 5, and 9 to 12, the receiving circuit 300 reduces the loss of each of the test output signals received from the CMOS image sensor through the MIPI C-PHY interface circuit in a test environment in which the CMOS image sensor is tested as a device under test. Thus, the receiving circuit 300 enables the test device to efficiently receive the test output signals. In addition, the receiving circuit 300 may be mounted on a printed circuit board (PCB) rather than an application specific integrated circuit ASIC. Thus, it is possible to reduce manufacturing cost of the receiving circuit 300 or the like.

Figure 3:
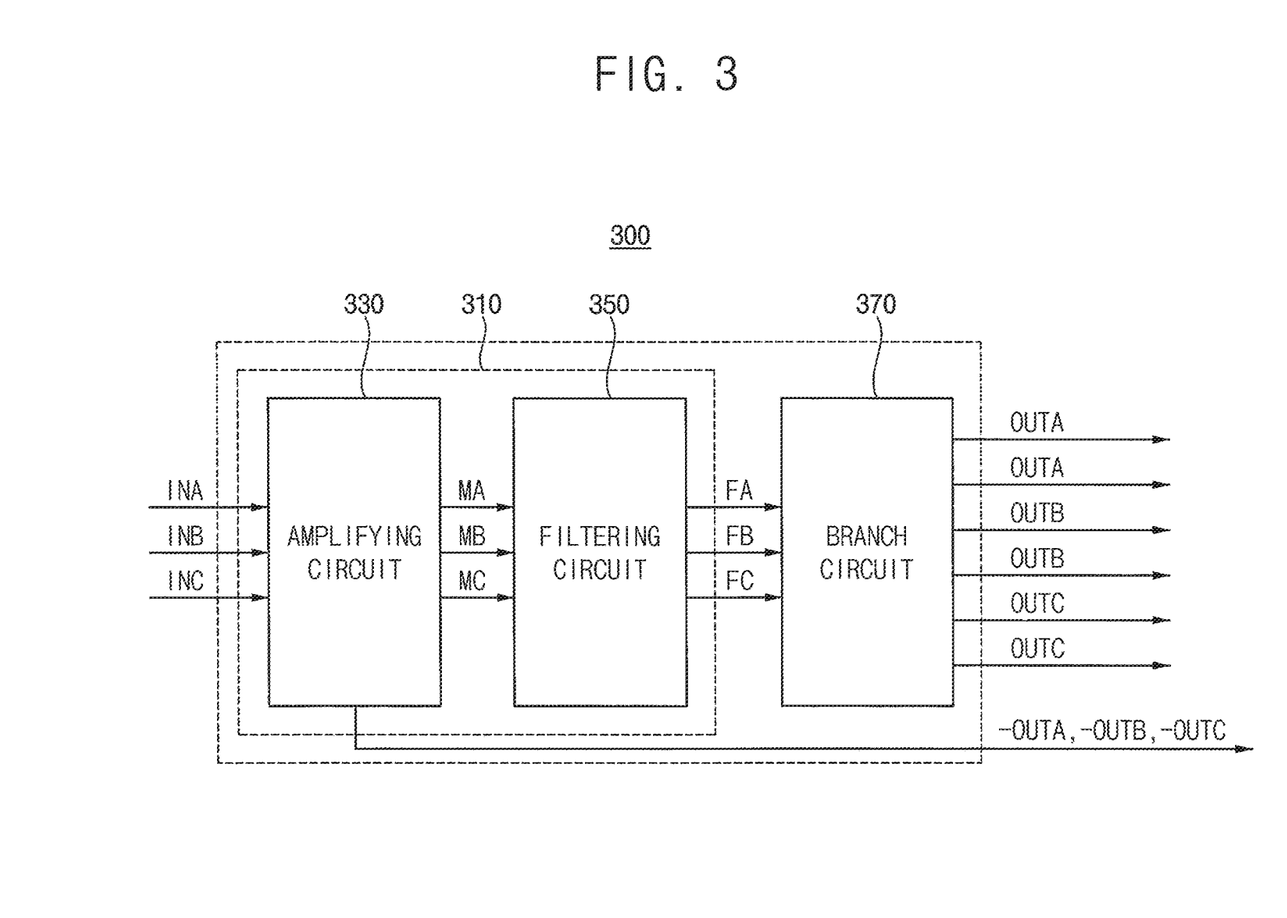
FIGS. 3, 4 and 5 are block diagrams illustrating example embodiments of the receiving circuit in FIGS. 1 and 2.

FIG. 3 is a block diagram illustrating an example embodiment of the receiving circuit in FIGS. 1 and 2. Referring to FIG. 3, a receiving circuit 300 may include an equalization circuit 310 and a branch circuit 370. The equalization circuit 310 may include an amplifying circuit 330 and a filtering circuit 350. As shown, the amplifying circuit 300 may receive a plurality of multi-level signals INA, INB and INC. The amplifying circuit 330 may amplify the plurality of multi-level signals INA, INB and INC to generate a plurality of amplified signals MA, MB and MC. The filtering circuit 350 may receive the plurality of amplified signals MA, MB and MC from the amplifying circuit 330. The filtering circuit 350 may filter the plurality of amplified signals MA, MB and MC to generate a plurality of filtering signals FA, FB and FC.

In some embodiments, voltage gain of the amplifying circuit 330 may be set based on a voltage level of each of the plurality of multi-level signals INA, INB and INC. For example, the voltage gain of the amplifying circuit 330 may be set based on the voltage level of each of the plurality of multi-level signals INA, INB and INC received during a predetermined time interval.

In some embodiments, the voltage gain of the amplifying circuit 330 may be set based on lengths of the plurality of lanes 500 as described above with reference to FIG. 2. For example, the voltage gain of the amplifying circuit 330 may be set to increase as the lengths of the plurality of lanes 500 increases. The voltage gain of the amplifying circuit 330 may be set to decrease as the lengths of the plurality of lanes 500 decreases.

In some embodiments, the filtering circuit 350 may be implemented with a high pass filter. For example, the filtering circuit 350 may include a series resonance circuit, which may be formed from a parallel RC network. In some embodiments, a cutoff frequency of the filtering circuit 350 may be set based on a signal-to-noise ratio (SNR) of the plurality of multi-level signals INA, INB and INC. For example, the cutoff frequency of the filtering circuit 350 may be set to decrease when the SNR of the plurality of multi-level signals INA, INB and INC is higher than a reference SNR, and the cutoff frequency of the filtering circuit 350 may be set to increase when the SNR of the plurality of multi-level signals is lower than the reference SNR. The reference SNR may be variously set according to a magnitude of the SNR of the plurality of multi-level signals INA, INB and INC. In some embodiments, the amplifying circuit 330 may further generate a plurality of inverted output signals −OUTA, −OUTB and −OUTC by inverting the plurality of amplified signals MA, MB and MC.

Figure 4:
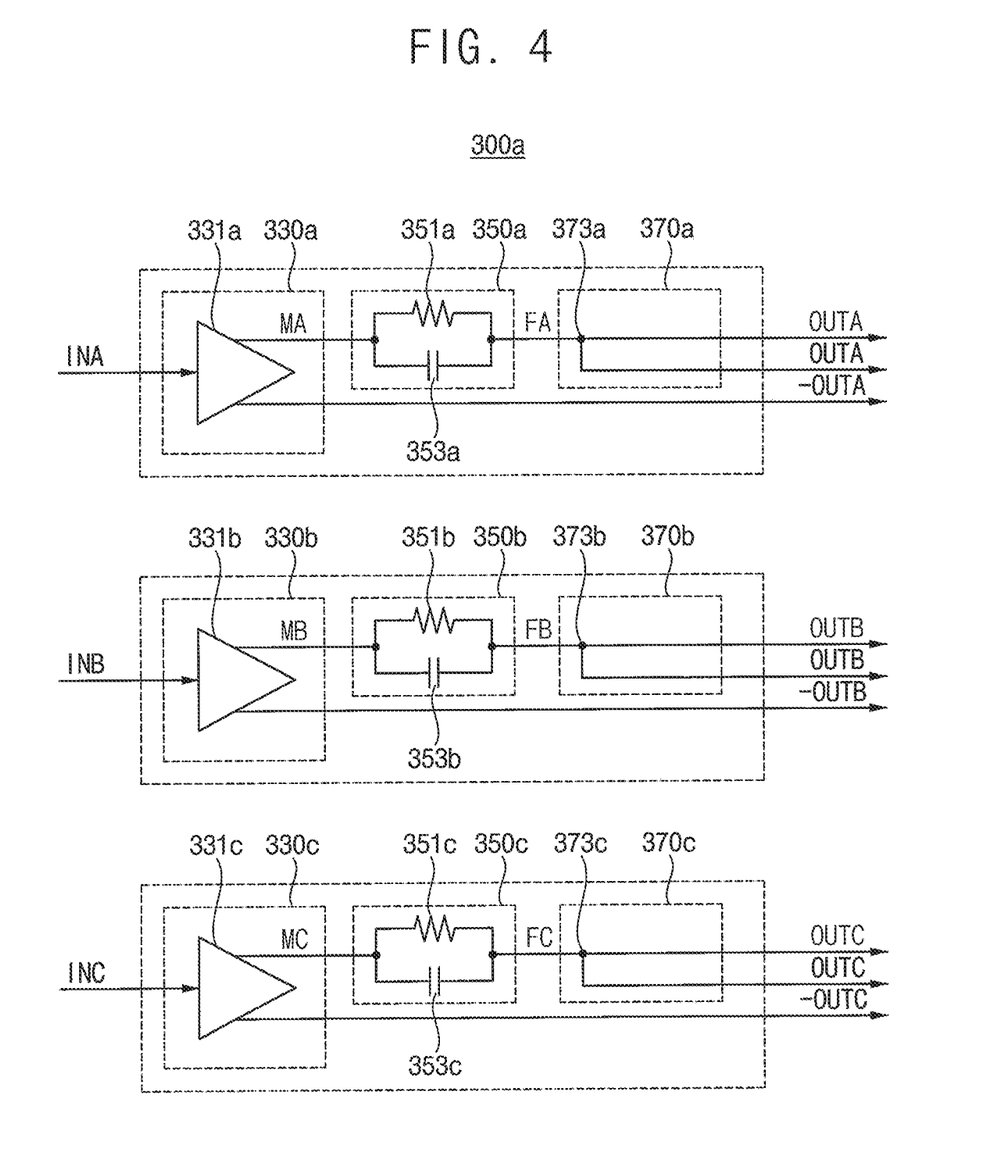

FIG. 4 is a block diagram illustrating an example embodiment of the receiving circuit in FIGS. 1 and 2. Referring to FIG. 4, a receiving circuit 300a may include a plurality of sub-amplifying circuits 330a, 330b and 330c, and each of the plurality of sub-amplifying circuits 330a, 330b and 330c may include an amplifier having differential output terminals. For example, the sub-amplifying circuit 330a may include an amplifier 331a, the sub-amplifying circuit 330b may include an amplifier 331b, and the sub-amplifying circuit 330c may include an amplifier 331c.

The receiving circuit 330a may include a plurality of sub-filtering circuits or filters 350a, 350b and 350c, and each of the plurality of sub-filtering circuits 350a, 350b and 350c may include a resistor and a capacitor. For example, the sub-filtering circuit 350a may include a resistor 351a and a capacitor 353a, the sub-filtering circuit 350b may include a resistor 351b and a capacitor 353b, and the sub-filtering circuit 350c may include a resistor 351c and a capacitor 353c. In other words, each of the filters 350a, 350b and 350c may include a parallel combination of a first impedance (e.g., resistive impedance) and a second impedance (e.g., capacitive impedance), which are responsive to the amplified version of each of the multi-level signals INA, INB and INC.

The receiving circuit 330a may include a plurality of sub-branch circuits 370a, 370b and 370c, and each of the plurality of sub-branch circuits 370a, 370b and 370c may include a branch node. For example, the sub-branch circuit 370a may include a branch node 373a, the sub-branch circuit 370b may include a branch node 373b, and the sub-branch circuit 370c may include a branch node 373c.

The amplifier 331a may receive a multi-level signal INA and amplify the multi-level signal INA to generate an amplified signal MA. The amplifier 331b may receive a multi-level signal INB and amplify the multi-level signal INB to generate an amplified signal MB. The amplifier 331c may receive multi-level signal INC and amplify the multi-level signal INC to generate an amplified signal MC.

In some embodiments, as described above with reference to FIG. 3, the voltage gain of the amplifiers 331a, 33b and 331c may be set based on the voltage level of the plurality of multi-level signals or the lengths of the plurality of lanes, however, example embodiments are not limited thereto. For example, the voltage gain of the amplifier included in each of the plurality of sub-amplifying circuits 330a, 330b and 330c may be set based on a voltage level of each of the plurality of multi-level signals INA, INB and INC. The voltage gain of the amplifier included in each of the plurality of sub-amplifying circuits 330a, 330b and 330c may be set based on the voltage level of each of the plurality of multi-level signals INA, INB and INC received during a predetermined time interval. For example, the voltage gain of the amplifier included in each of the plurality of sub-amplifying circuits 330a, 330b and 330c may be set based on a length of the plurality of lanes. The voltage gain of the amplifier included in each of the plurality of sub-amplifying circuits 330a, 330b and 330c may be set to increase as the length of each of the plurality of lanes increase, and may be set to decrease as the length of each of the plurality of lanes decrease.

The parallel-connected resistor 351a and the capacitor 353a within the sub-filtering circuit 350a may receive the amplified signal MA and filter the amplified signal MA to generate a filtering signal FA. The resistor 351b and the capacitor 353b within the sub-filtering circuit 350b may receive the amplified signal MB and filter the amplified signal MB to generate a filtering signal FB. The resistor 351c and the capacitor 353c within the sub-filtering circuit 350c may receive the amplified signal MC and filter the amplified signal MC to generate a filtering signal FC.

In some embodiments, as described above with reference to FIG. 3, the resistors 351, 351b and 351c and the capacitors 353a, 353b and 353c may operate as a high pass filter, and the cutoff frequency of the high pass filter may be set based on the SNR of the plurality of multi-level signals INA, INB and INC, however, example embodiments are not limited thereto.

The branch node 373a may receive the filtering signal FA and branch the filtering signal FA to generate branch signals OUTAs. The branch node 373b may receive the filtering signal FB and branch the filtering signal FB to generate branch signals OUTBs. The branch node 373c may receive the filtering signal FC and branch the filtering signal FC to generate branch signals OUTCs.

The amplifier 331a may further generate an inverted output signal −OUTA of the amplified signal MA. The amplifier 331b may further generate an inverted output signal −OUTB of the amplified signal MB. The amplifier 331c may further generate an inverted output signal −OUTC of the amplified signal MC.

Figure 5:
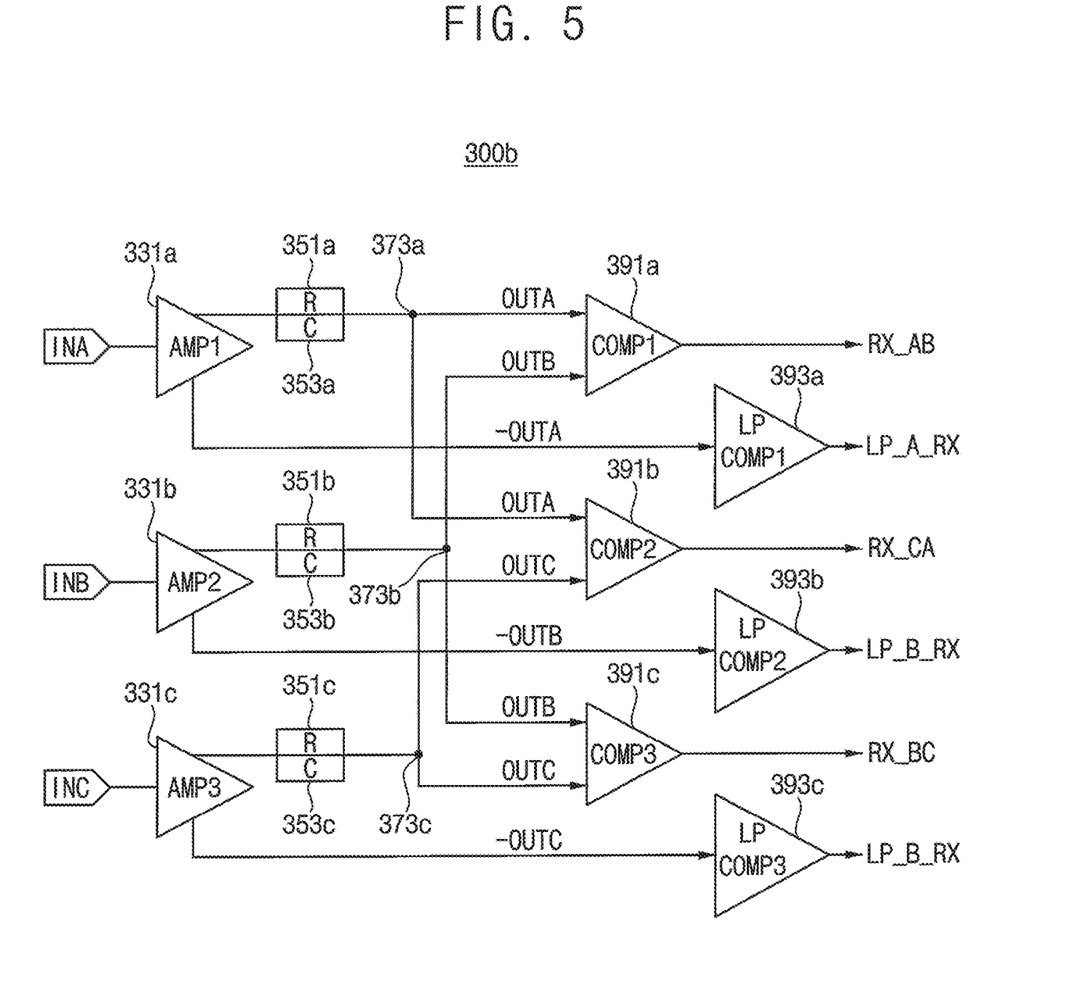

FIG. 5 is a block diagram illustrating another example embodiment of the receiving circuit in FIGS. 1 and 2. In FIG. 5, redundant descriptions of components having the same reference numerals as components in FIG. 4 will be omitted. Referring to FIG. 5, a receiving circuit 300b may include amplifiers 331a, 331b and 331c, resistors 351a, 351b and 351c, capacitors 353a, 353b and 353c, high-speed mode comparators 391a, 391b and 391c, and low-power mode comparators 393a, 393b and 393c. The receiving circuit 330b of FIG. 5 further includes the high-speed mode comparators 391a, 391b and 391c and the low-power mode comparators 393a, 393b and 393c compared to the receiving circuits 300 and 300a of FIGS. 3 and 4.

The plurality of high-speed mode comparators 391a, 391b and 391c (COMP1, COMP2, COMP3) may receive the plurality of branch signals OUTA, OUTB and OUTC, and compare the plurality of branch signals OUTA, OUTB and OUTC to generate a plurality of comparison result signals RX_AB, RX_CA and RX_BC. For example, the high-speed mode comparator 391a may receive the branch signals OUTA and OUTB, compare the branch signal OUTA with the branch signal OUTB, and output the comparison result signal RX_AB. The high-speed mode comparator 391*b* may receive the branch signals OUTC and OUTA, compare the branch signal OUTC with the branch signal OUTA, and output the comparison result signal RX_CA. The high-speed mode comparator 391*c* may receive the branch signals OUTB and OUTC, compare the branch signal OUTB with the branch signal OUTC, and output the comparison result signal RX_BC.

The low-power mode comparators 393*a*, 393*b* and 393*c* (LP COMP1, LP COMP2, LP COMP3) may receive a plurality of inverted output signals −OUTA, −OUTB and −OUTC and output a plurality of low-power mode signals LP_A_RX, LP_B_RX and LP_C_RX based on the plurality of inverted output signals −OUTA, −OUTB and −OUTC. For example, the low-power mode comparator 393*a* may receive the inverted output signal −OUTA and output the first low-power mode signal LP_A_RX based on the inverted output signal −OUTA. The low-power mode comparator 393*b* may receive the inverted output signal −OUTB and output the second low-power mode signal LP_B_RX based on the inverted output signal −OUTB. The low-power mode comparator 393*c* may receive the inverted output signal −OUTC and output the third low-power mode signal LP_C_RX based on the inverted output signal −OUTC.

Figure 6:
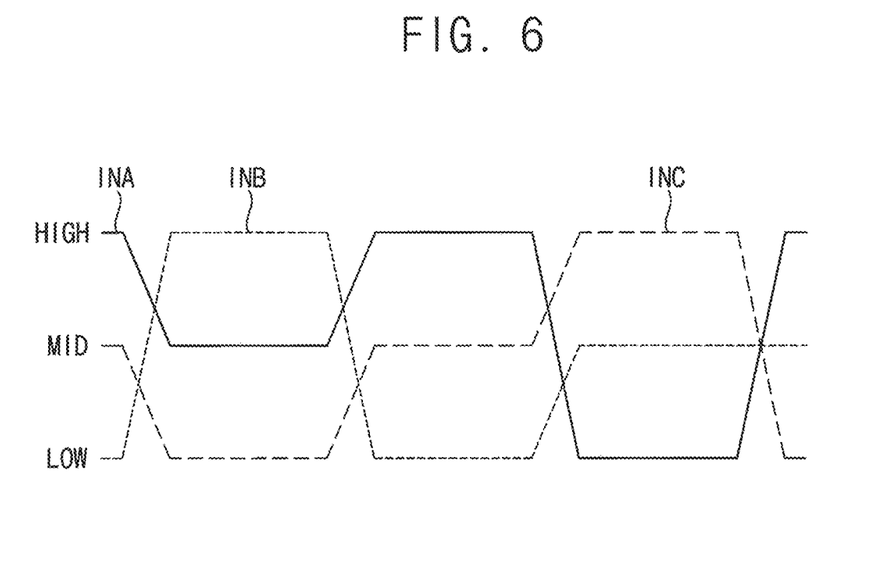
FIG. 6 is a diagram for describing the plurality of multi-level signals in FIGS. 2 to 5.

FIG. 6 is a diagram for describing the plurality of multi-level signals in FIGS. 2 to 5. Referring to FIG. 6, each of a plurality of multi-level signals INA, INB and INC may include signal levels of 'HIGH', 'MID' and 'LOW'. The plurality of multi-level signals INA, INB and INC may be received through one data lane including three lines. The three lines may include all of the signal levels of 'HIGH', 'MID' and 'LO' in a certain time interval, and each of the three lines may include a signal level different from the signal level in the previous time interval in a subsequent time interval. For example, when the three lines include multi-level signals INA: 'HIGH', INB: 'MID', and INC: 'LOW' in a first time interval, the three lines may include multi-level signals INA: 'MID', INB: 'LOW', and INC: 'HIGH' in a second time interval after the first time interval. The three lines may include multi-level signals INA: 'HIGH', INB: 'MID', and INC: 'LOW' in a third time interval after the second time interval. The three lines may include multi-level signals INA: 'LOW', INB: 'HIGH', and INC: 'MID' in a fourth time interval after the third time interval. In some embodiments, the plurality of multi-level signals INA, INB and INC may be provided to the receiving circuits 300, 300*a* and 300*b* in FIGS. 2 to 5.

Figure 7:
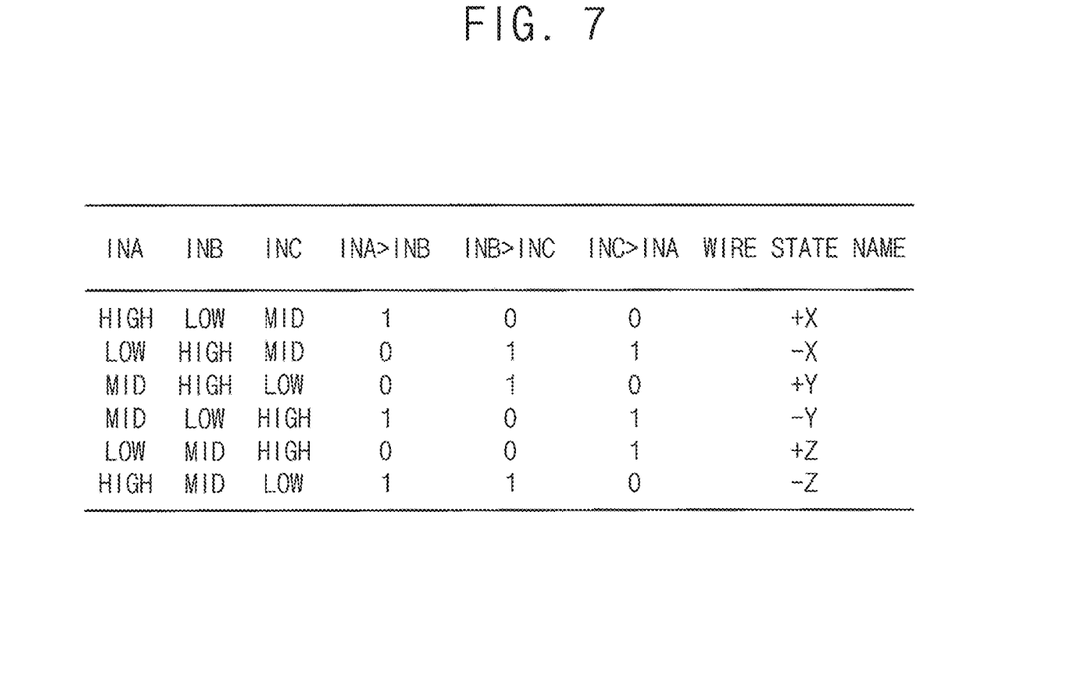
FIG. 7 is a diagram for describing the plurality of comparison result signals in FIG. 5.

FIG. 7 is a "truth table" diagram for describing the plurality of comparison result signals in FIG. 5. Referring to FIGS. 5 to 7, comparison result signals RX_AB, RX_BC and RX_CA are output based on a plurality of multi-level signals INA, INB and INC. For example, when a plurality of multi-level signal INA, INB and INC have signal levels of 'HIGH', 'LOW', 'MID', respectively, the comparison result signals RX_AB, RX_BC and RX_CA may have values of {'1', '0', '0'} respectively. When a plurality of multi-level signal INA, INB and INC have signal levels of 'LOW', 'HIGH', 'MID', respectively, the comparison result signals RX_AB, RX_BC and RX_CA may have values of {'0', '1', '1'}, respectively.

When a plurality of multi-level signal INA, INB and INC have signal levels of 'MID', 'HIGH', 'LOW', respectively, the comparison result signals RX_AB, RX_BC and RX_CA may have values of {'0', '1', '0'} respectively. When a plurality of multi-level signal INA, INB and INC have signal levels of 'MID', 'LOW', 'HIGH', respectively, the comparison result signals RX_AB, RX_BC and RX_CA may have values of {'1', '0', '1'}, respectively.

When a plurality of multi-level signal INA, INB and INC have signal levels of 'LOW', 'MID', 'HIGH', respectively, the comparison result signals RX_AB, RX_BC and RX_CA may have values of {'0', '0', '1'} respectively. When a plurality of multi-level signal INA, INB and INC have signal levels of 'HIGH', 'MID', 'LOW', respectively, the comparison result signals RX_AB, RX_BC and RX_CA may have values of {'1', '1', '0'}, respectively.

The comparison result signals RX_AB, RX_BC and RX_CA in FIG. 7 may be expressed in one of {'+X', '−X', '+Y', '−Y', '+Z', '−Z'} as wire state names in various cases. Although not illustrated in FIG. 7, the wire state names may be converted into symbol values having a plurality of digits, and the symbol values may be mapped to 16-bit integer values.

Figure 8A:
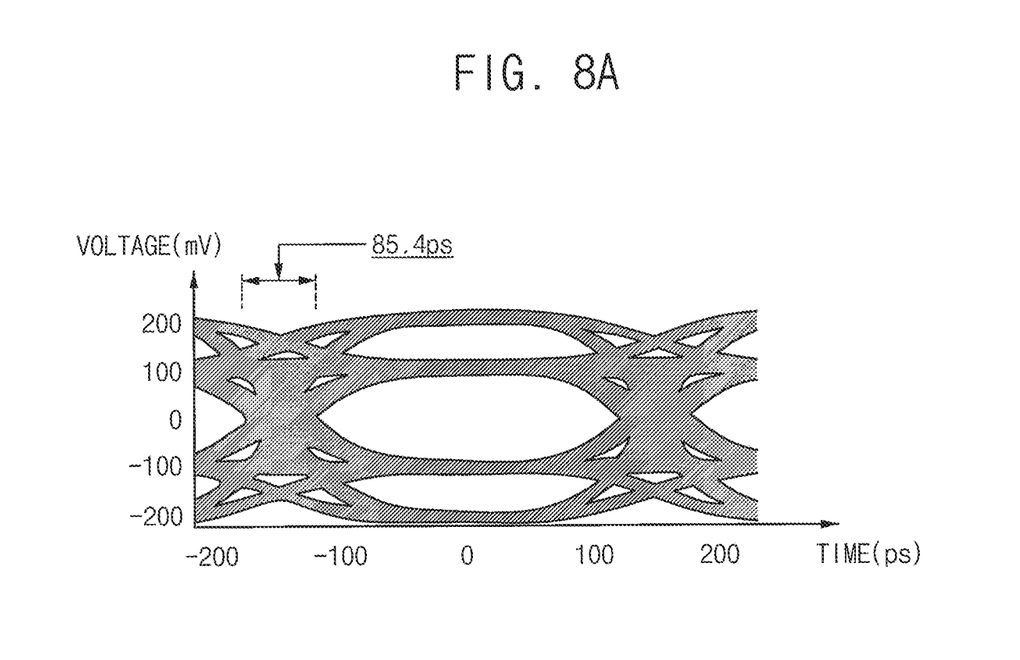
FIGS. 8A, 8B and 8C are eye diagrams illustrating the plurality of comparison result signals in FIG. 5 measured under various conditions.
Figure 8B:
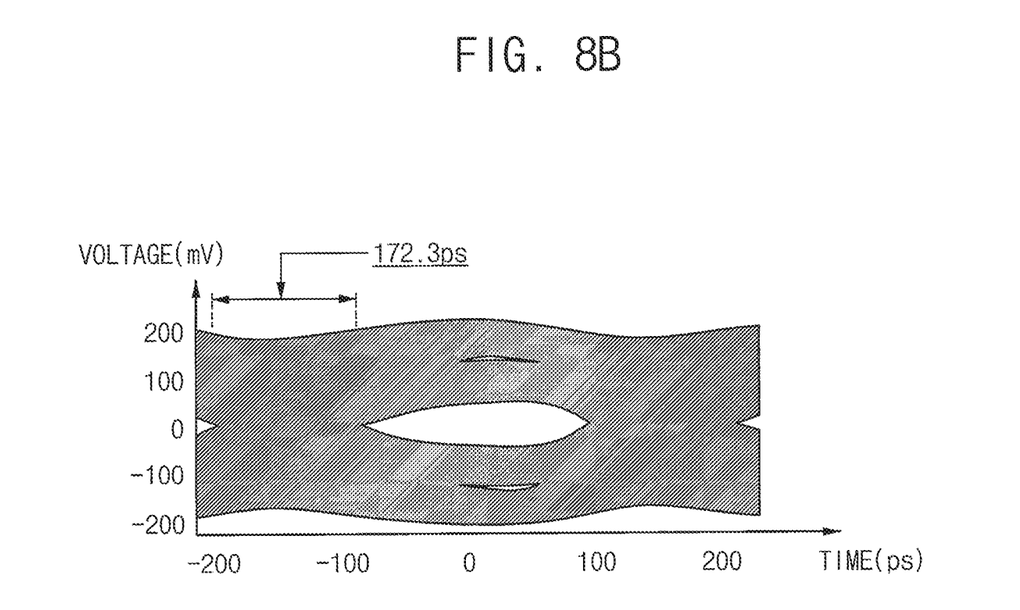
Figure 8C:
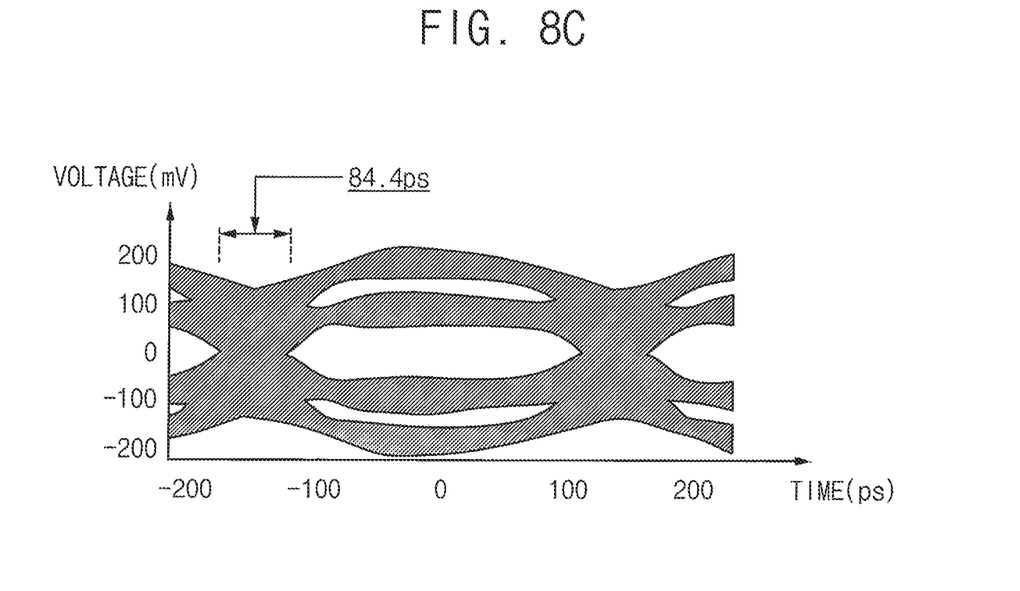

FIGS. 8A, 8B and 8C are eye diagrams illustrating the plurality of comparison result signals in FIG. 5 measured under various conditions. In FIGS. 8A, 8B and 8C, a horizontal axis represents time (ps) and a vertical axis represents voltage level (mV). FIG. 8A represents a case in which a plurality of multi-level signals INA, INB and INC are provided to high-speed mode comparators 391*a*, 391*b* and 391*c* without passing through the transmission line 500 to generate comparison result signals in FIGS. 1 and 2, as an ideal case. FIGS. 8B and 8C represent a case in which the plurality of multi-level signals INA, INB and INC are provided to the high-speed mode comparators 391*a*, 391*b* and 391*c* through the transmission line 500 having a reference length or more to generate the comparison result signals. FIG. 8B represent a case in which a receiving circuit according to example embodiments is not used, and FIG. 8C represent a case in which the receiving circuit according to example embodiments is used. In FIGS. 8A, 8B and 8C, jitter occurring in an interval between a first time point, e.g., −200 ps, and a second time point, e.g., −100 ps, was observed.

Referring to FIG. 8A, a magnitude of the jitter observed in an ideal case has a value corresponding to 85.4 ps. Referring to FIG. 8B, when a length of the transmission line is greater than or equal to a reference length, the magnitude of the jitter observed has a value corresponding to 172.3 ps. Referring to FIG. 8C, when the length of the transmission line is greater than or equal to the reference length, the magnitude of jitter observer has a value corresponding to 84.4 ps, which shows substantial improvement relative to the result of FIG. 8B and essentially matches the ideal case of FIG. 8A.

Figure 9:
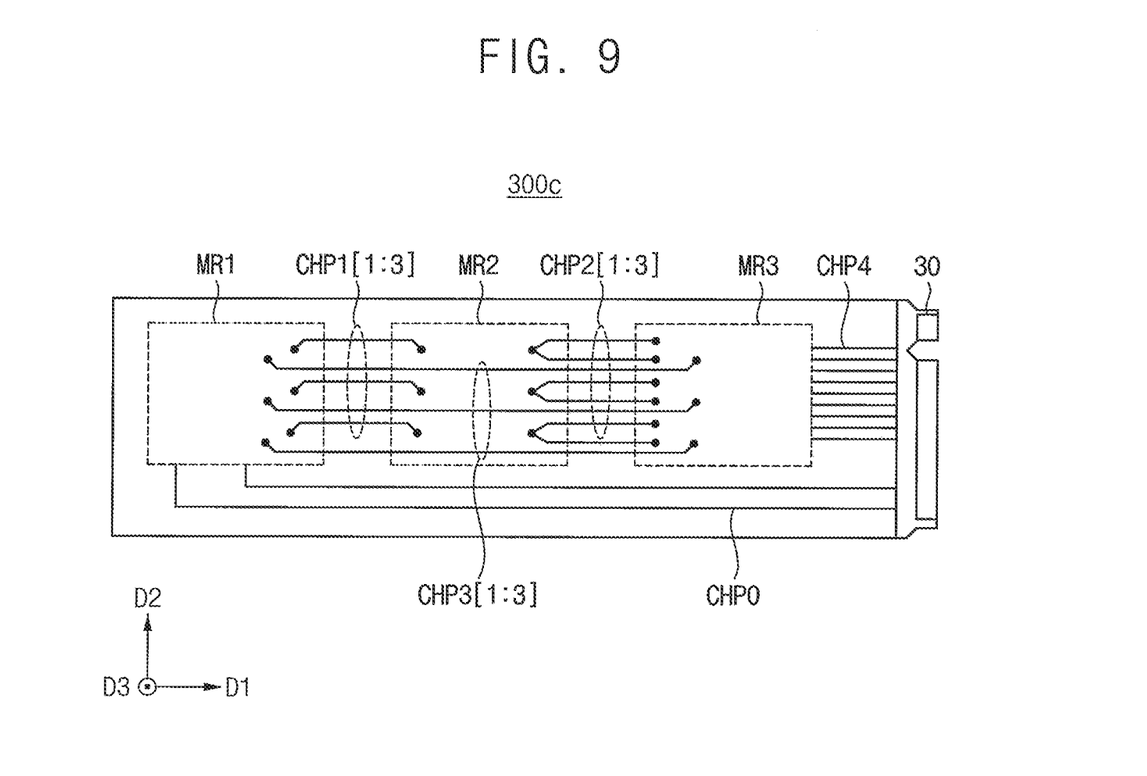
FIG. 9 is a plan view illustrating a printed circuit board on which a receiving circuit according to example embodiments is mounted.
Figure 10:
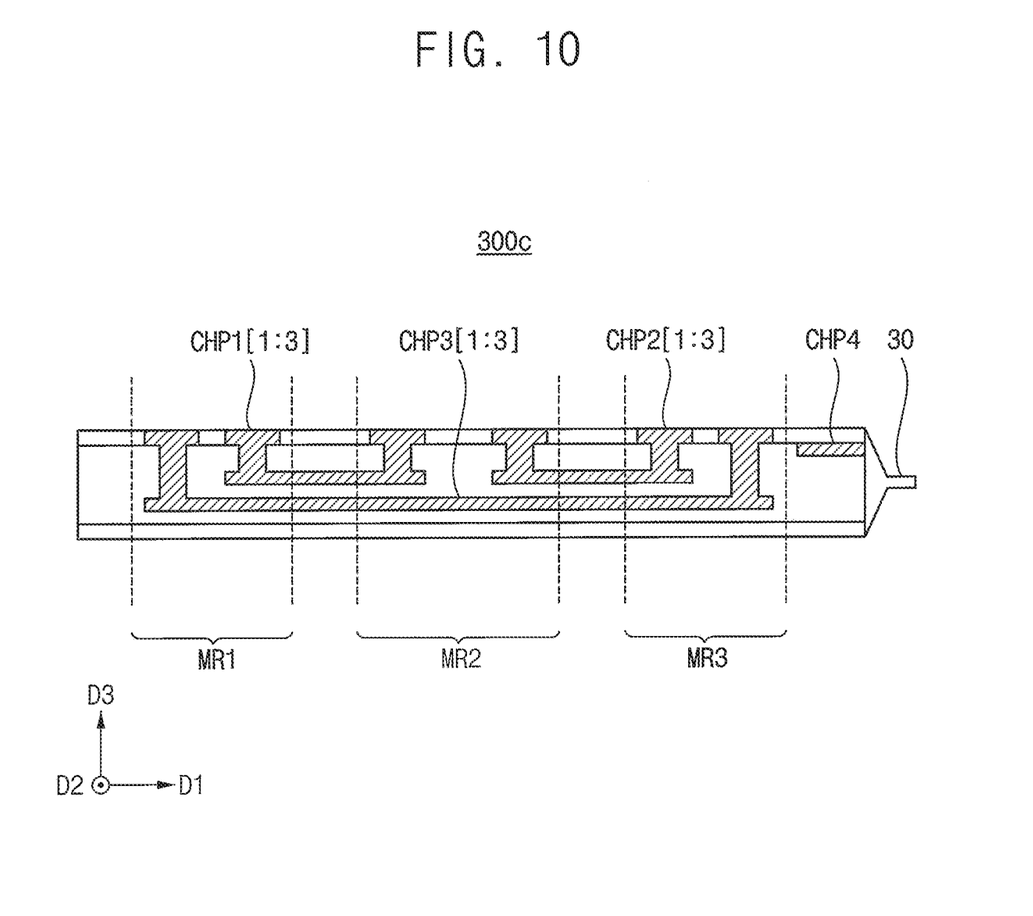
FIG. 10 is a cross-sectional view illustrating a printed circuit board on which a receiving circuit according to example embodiments is mounted.

Hereinafter, example embodiments that a receiving device includes a printed circuit board and a receiving circuit mounted on the printed circuit board are described with reference to FIGS. 9 and 10. FIG. 9 is a plan view illustrating a printed circuit board on which a receiving circuit according to example embodiments is mounted. FIG. 10 is a cross-sectional view illustrating a printed circuit board on which a receiving circuit according to example embodiments is mounted.

Referring to FIGS. 5 and 9, a printed circuit board 300*c* may include a plurality of mounting areas MR1, MR2 and MR3, a plurality of channel patterns CHP0, CHP1, CHP2, CHP3 and CHP4, and a connector 30. The amplifiers 331, 331*b* and 331*c* in FIG. 5 may be formed in the first mounting area MR1, the resistors 351*a*, 351*b* and 351*c*, and the capacitors 353*a*, 353*b* and 353*c* in FIG. 5 may be formed in the second mounting area MR2. The high-speed mode comparators 391a, 391b and 391c, and the low-power mode comparators 393a, 393b and 393c in FIG. 5 may be formed in the third mounting area MR3.

The amplifiers 331a, 331b and 331c may be connected to the resistors 351a, 351b and 351c, and the capacitors 353a, 353b and 353c through the first channel pattern CHP1[1:3]. The resistors 351a, 351b and 351c, and capacitors 353a, 353b and 353c may be connected to the high-speed mode comparators 391a, 391b and 391c through the second channel pattern CHP2[1:3]. The resistors 351a, 351b and 351c, and the capacitors 353a, 353b and 353c may be connected to the low-power mode comparators 393a, 393b and 393c through the third channel pattern CHP3[1:3]. The high-speed mode comparators 391a, 391b and 391c, and the low-power mode comparators 393a, 393b and 393c may be connected to the connector 30 through the fourth channel pattern CHP4. The plurality of multi-level signals INA, INB and INC may be input to the amplifiers 331, 33b and 331c formed in the first mounting area MR1 through the fifth channel pattern CHP0.

Referring to FIGS. 9 and 10, the printed circuit board 300c may include an upper protective layer 10, a body layer 15 and a lower protective layer 20. The upper protective layer 10 and the lower protective layer 20 may protect the body layer 15. In some embodiments, the upper protective layer 10 and the lower protective layer 20 may be formed of a solder resist layer.

The body layer 15 may be implemented by compressing a polymer material such as a thermosetting resin, an epoxy resin such as flame retardant 4 (FR-4), bismaleimide triazine (BT), ajinomoto build up film (ABF), or a phenol resin to predetermined thickness to form a thin shape, coating a copper foil and then patterning to form channel patterns that are transmission paths of electrical signals.

The printed circuit board 300c may be classified into a single-layer printed circuit board in which a wiring is formed on only one side and a double-layer printed circuit board in which the wiring is formed on both sides. The number of layers of copper foil may be formed in three or more layers using an insulator called 'prepreg', and by forming three or more wiring layers according to the number of layers of the formed copper foil, a printed circuit board of multi-layer wiring may be implemented.

The plurality of channel patterns (e.g., CHP1, CHP2 and CHP3) may include conductive traces extending in a D1 direction, conductive vias extending in a D3 direction and conductive pads formed on the conductive vias, and the channel pattern (e.g., CHP4) may include only conductive traces extending in the D1 direction.

Figure 11:
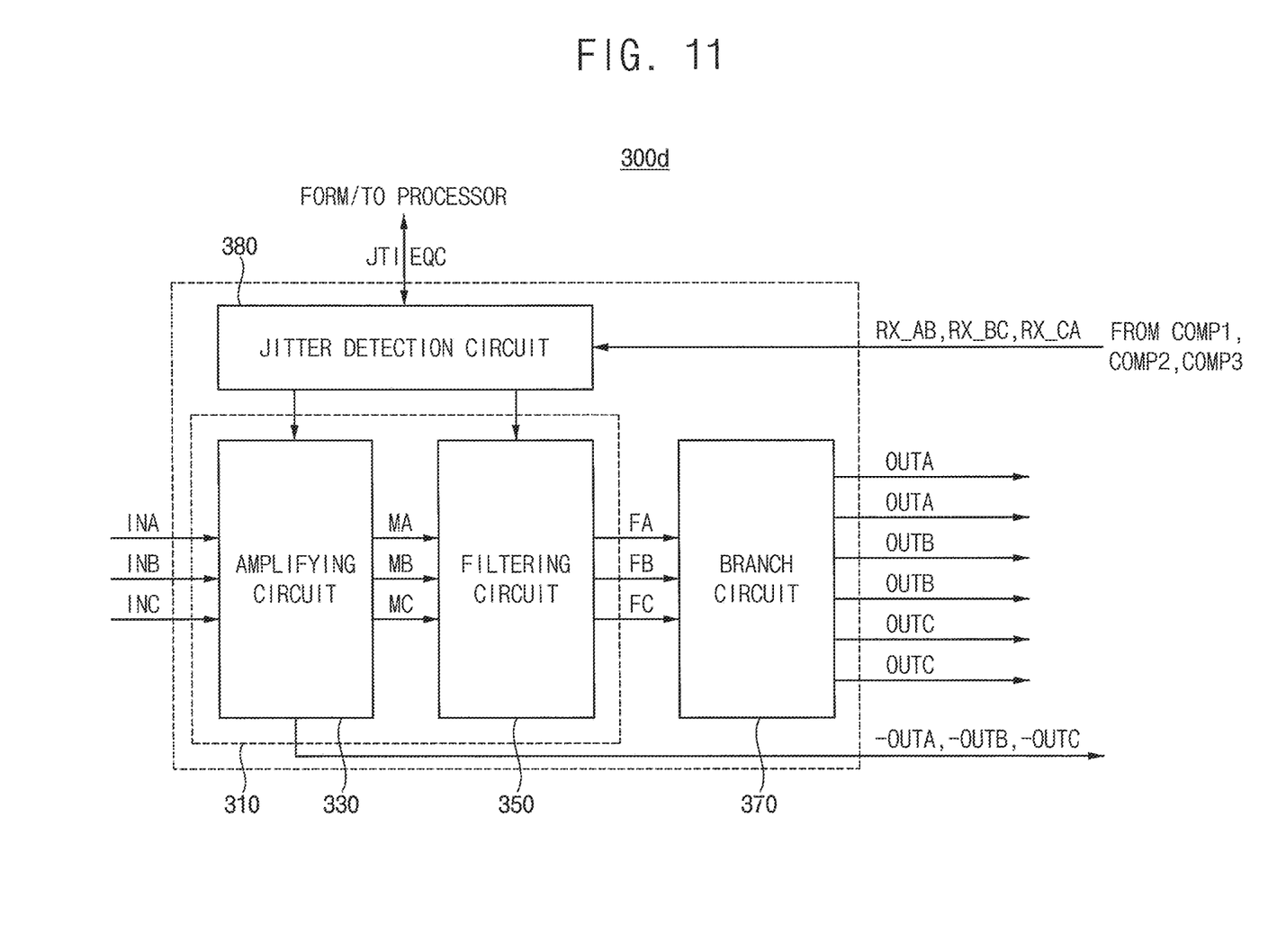
FIG. 11 is a block diagram illustrating an example embodiment of the receiving circuit in FIGS. 1 and 2.

FIG. 11 is a block diagram illustrating an example embodiment of the receiving circuit in FIGS. 1 and 2. Referring to FIGS. 3 and 11, a receiving circuit 300d may further include a jitter detection circuit 380 compared to the receiving circuit 300 of FIG. 3. In FIG. 11, redundant descriptions of components having the same reference numerals as components in FIG. 3 will be omitted.

The receiving circuit 300d may include an equalization circuit 310, a branch circuit 370 and a jitter detection circuit 380. The equalization circuit 310 may include an amplifying circuit 330 and a filtering circuit 350. The amplifying circuit 330 may amplify a plurality of multi-level signals INA, INB and INC to generate a plurality of amplified signals MA, MB and MC. The filtering circuit 350 may filter the plurality of amplified signals MA, MB and MC to generate a plurality of filtering signals FA, FB and FC. The branch circuit 370 may branch each of the plurality of filtering signals FA, FB and FC to generate two of a plurality of branch signals OUTA, OUTB and OUTC. For example, the branch circuit 370 may branch the filtering signal FA to generate two branch signals OUTA and OUTA, branch the filtering signal FB to generate two branch signals OUTB and OUTB, and branch the filtering signal FC to generate two branch signals OUTC and OUTC.

The jitter detection circuit 380 may receive comparison result signals RX_AB, RX_BC and RX_CA from the high-speed mode comparators 391a, 391b and 391c in FIG. 5. The jitter detection circuit 380 may detect jitters based on the comparison result signals RX_AB, RX_BC and RX_CA to generate jitter information JTI. The jitter detection circuit 380 may transfer the jitter information JTI to the processor 400 in FIG. 1. The processor 400 may generate an equalization coefficient EQC based on the jitter information JTI and transmit the equalization coefficient EQC to the jitter detection circuit 380. The jitter detection circuit 380 may adjust a voltage gain of the amplifying circuit 330 or cutoff frequency of the filtering circuit 350 based on the equalization coefficient EQC. In some embodiments, the processor 400 may compare the jitter information JTI with reference jitter information to generate the equalization coefficient EQC. The reference jitter information may include information on the amount of jitters observed in the ideal case described above with reference to FIG. 8A.

Figure 12:
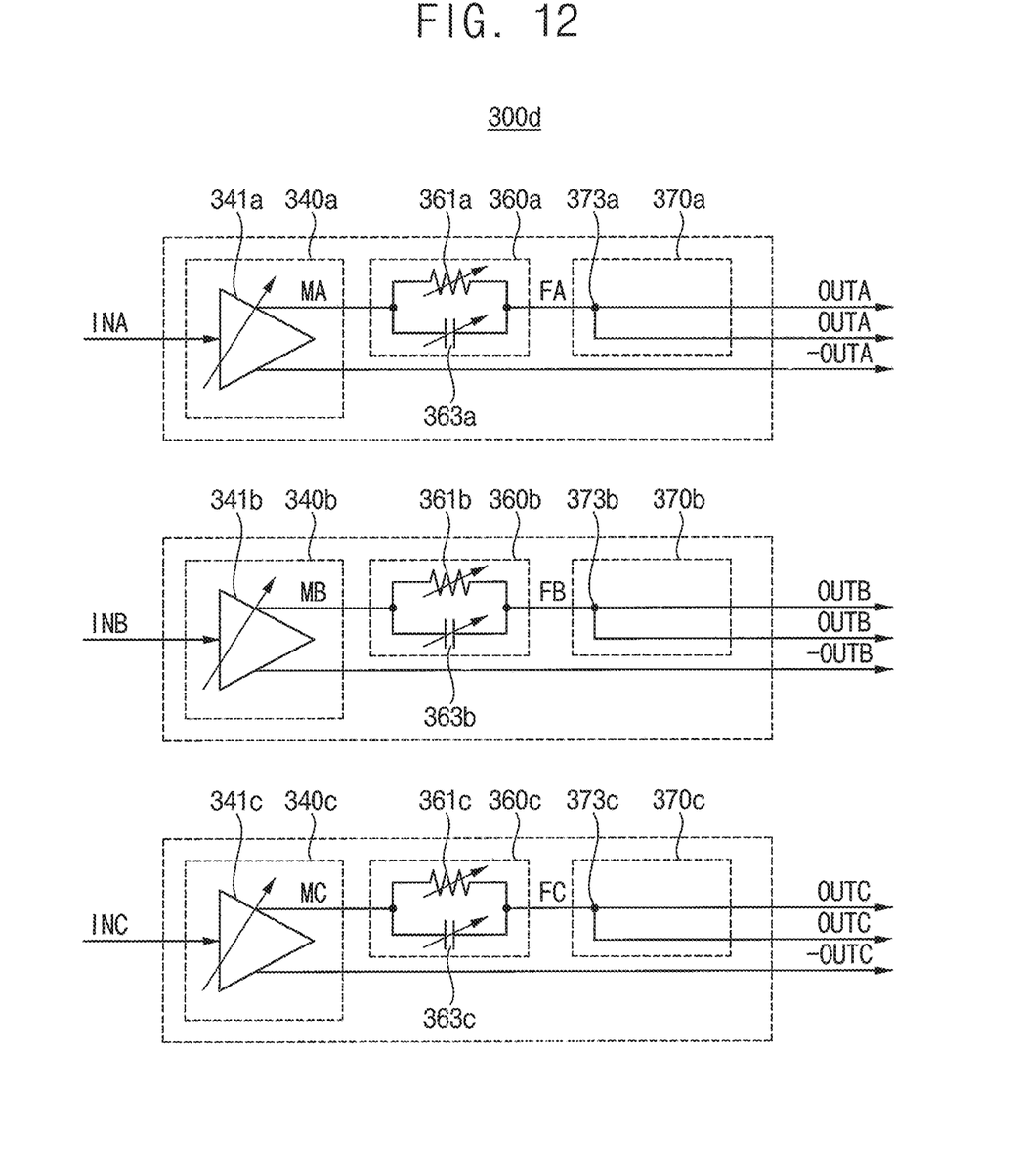
FIG. 12 is a block diagram illustrating an example embodiment of the receiving circuit in FIG. 11.

FIG. 12 is a block diagram illustrating an example embodiment of the receiving circuit in FIG. 11. Referring to FIG. 12, a receiving circuit 300d may include a plurality of sub-amplifying circuits 340a, 340b and 340c. The sub-amplifying circuit 340a may include a variable gain amplifier 341a, the sub-amplifying circuit 340b may include a variable gain amplifier 341b, and the sub-amplifying circuit 340c may include a variable gain amplifier 341c.

The receiving circuit 300d may include a plurality of sub-filtering circuits 360a, 360b and 360c. The sub-filtering circuit 360a may include a variable resistor 361a and a variable capacitor 363a, the sub-filtering circuit 360b may include a variable resistor 361b and a variable capacitor 363b, and the sub-filtering circuit 360c may include a variable resistor 361c and a variable capacitor 363c.

The receiving circuit 330d may include a plurality of sub-branch circuits 370a, 370b and 370c. The sub-branch circuit 370a may include a branch node 373a, the sub-branch circuit 370b may include a branch node 373b, and the sub-branch circuit 370c may include a branch node 373c.

The variable gain amplifier 341a may receive a multi-level signal INA and amplify the multi-level signal INA to generate an amplified signal MA. The variable gain amplifier 341b may receive a multi-level signal INB and amplify the multi-level signal INB to generate an amplified signal MB. The variable amplifier 341c may receive multi-level signal INC and amplify the multi-level signal INC to generate an amplified signal MC. In some embodiments, the voltage gain of the variable gain amplifiers 341, 341b and 341c may be adjusted based on the equalization coefficient EQC generated by the processor 400 as described above with reference to FIG. 11. However, example embodiments are not limited thereto.

The variable resistor 361a and the variable capacitor 363a may receive the amplified signal MA and filter the amplified signal MA to generate a filtering signal FA. The variable resistor 361b and the variable capacitor 363b may receive the amplified signal MB and filter the amplified signal MB to generate a filtering signal FB. The variable resistor 361c and the variable capacitor 363c may receive the amplified signal MC and filter the amplified signal MC to generate a filtering signal FC.

In some embodiments, as described above with reference to FIG. 4, the variable resistors 361, 361b and 361c and the variable capacitors 363a, 363b and 363c may operate as a high pass filter, and the cutoff frequency of the high pass filter may be adjusted based on the equalization coefficient EQC generated by the processor 400, however, example embodiments are not limited thereto.

The branch node 373a may receive the filtering signal FA and branch the filtering signal FA to generate branch signals OUTAs. The branch node 373b may receive the filtering signal FB and branch the filtering signal FB to generate branch signals OUTBs. The branch node 373c may receive the filtering signal FC and branch the filtering signal FC to generate branch signals OUTCs.

The variable gain amplifier 341a may further generate an inverted output signal −OUTA of the amplified signal MA. The variable gain amplifier 341b may further generate an inverted output signal −OUTB of the amplified signal MB. The variable gain amplifier 341c may further generate an inverted output signal −OUTC of the amplified signal MC.

Figure 13:
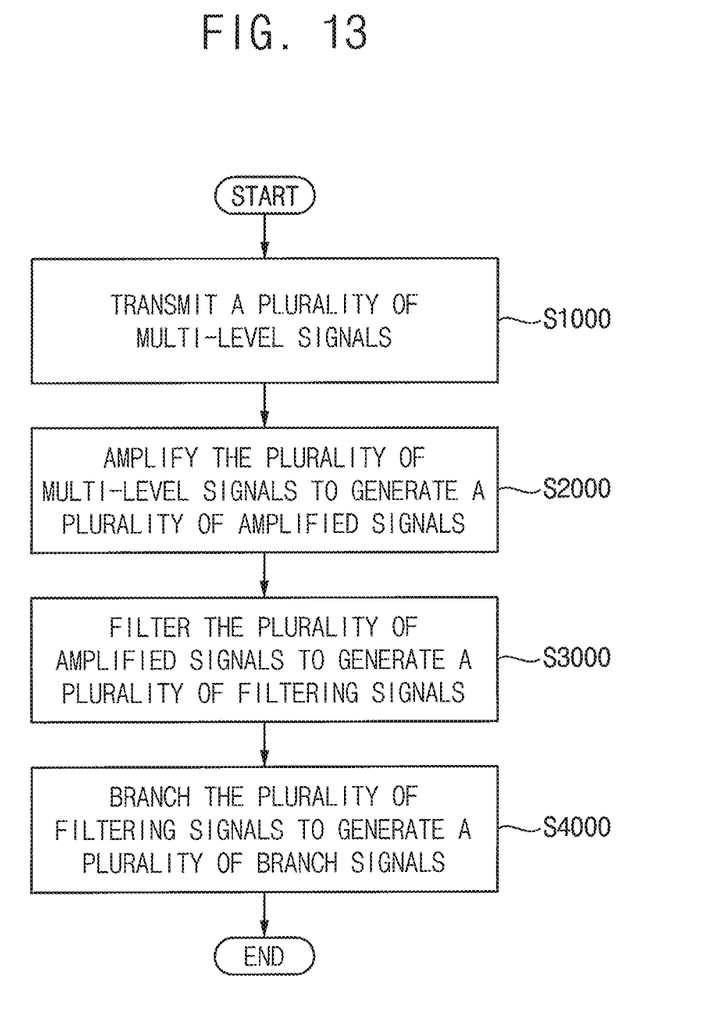
FIG. 13 is a flowchart illustrating a method of operating an interface circuit including a receiving circuit according to example embodiments.

FIG. 13 is a flowchart illustrating a method of operating an interface circuit including a receiving circuit according to example embodiments. Referring to FIG. 13, in a method of operating an interface circuit including a receiving circuit according to example embodiments, the interface circuit may include a transmitting device, a receiving device and a transmission line. In some embodiments, the interface circuit may be applied to a test system capable of testing defects in operations of any manufactured electronic components. In this case, the transmitting device may be a test board, and the receiving device may be a test device. The method of operating the interface circuit may be performed in the receiving device.

A plurality of multi-level signals may be transmitted from the transmitting device to the receiving device (S1000). In some embodiments, the transmitting device and the receiving device may be connected through the interface circuit. In this case, the interface circuit connecting the transmitting device and the receiving device may be a MIPI C-PHY interface circuit. The plurality of multi-level signals may be amplified to generate a plurality of amplified signals (S2000). The plurality of amplified signals may be filtered to generate a plurality of filtering signals (S3000). The plurality of filtering signals may be branched to generate a plurality of branch signals (S4000).

Figure 14:
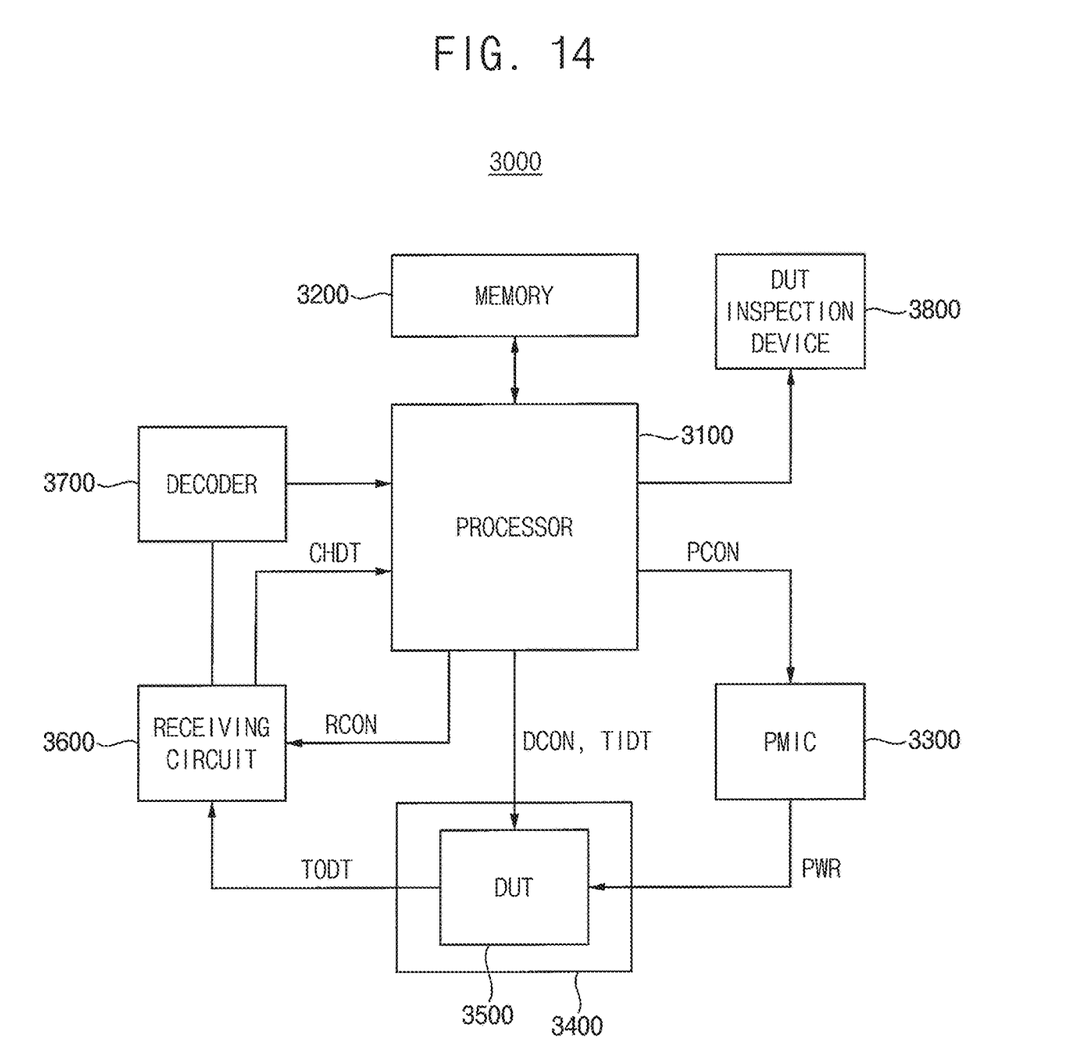
FIG. 14 is a block diagram illustrating an example embodiment of an electronic system including a receiving circuit according to example embodiments.

FIG. 14 is a block diagram illustrating an example embodiment of an electronic system including a receiving circuit according to example embodiments. Referring to FIG. 14, an electronic system 3000 may include a processor 3100, a memory 3200, a power management integrated circuit (PMIC) 3300, a socket 3400, a device under test (DUT) 3500, a receiving circuit 3600, a decoder 3700 and a DUT inspection device 3800. The processor 3100 may control overall operations of the components 3200, 3300, 3400, 3500, 3600, 3700 and 3800 of the electronic system 3000.

In some embodiments, the processor 3100 may provide test input signals to the DUT 3500, and may control the PMIC 3300 to supply power necessary for testing the DUT 3500. In some embodiments, the processor 3100 may implemented with a central processing unit (CPU), a graphic processing unit (GPU), a neural processing unit (NPU), a digital signal processor (DSP), an image signal processor (ISP), a vision processing unit (VPU), a vision intellectual property (VIP), and the like.

The DUT 3500 may be mounted on the socket 3400 to receive the test input signals in an environment similar to an actual operating environment, and generate test output signals based on the test input signals. In some embodiments, the DUT 3500 may generate the test output signals based on the test input signals in an environment similar to an environment in which a mobile system including an application processor actually operates. The mobile system may include a mobile phone, a smart phone, a tablet personal computer (PC), a laptop computer, a personal digital assistant (PDA), a portable multimedia player (PDA), a portable multimedia player (PMP), a digital camera, a camcorder, a portable game console, a music player, a video player, a navigation device, a wearable device, an Internet of Things (IoT) device, an e-book, a virtual reality (VR) device, an augmented reality (AR) device, a drone, and the like.

The memory 3200 may store the test input signals provided by the processor 3100 to the DUT 3500 or the test output signals provided by the DUT 3500 to the receiving circuit 3600. In some embodiments, the memory 3200 may include at least one of a volatile memory such as dynamic random access memory (DRAM) and static random access memory (SRAM), and the like, and a nonvolatile memory such as a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and the like.

The decoder 3700 may receive the test output signals from the receiving circuit 3600. The decoder 3700 may decode the test output signals to generate decoding result signals, and may provide the decoding result signals to the processor 3100.

The processor 3100 may provide the decoding result signals to the DUT inspection device 3800, and the DUT inspection device 3800 may inspect defects of the DUT 3500 based on the decoding result signals.

As described above, the receiving circuit, the printed circuit board and the interface circuit according to example embodiments reduces the loss of each of the test output signals received from the CMOS image sensor through the MIPI C-PHY interface circuit in a test environment in which the CMOS image sensor is tested as a device under test. Thus, the receiving circuit enables the test device to efficiently receive the test output signals. In addition, the receiving circuit may be mounted on a printed circuit board (PCB) rather than an application specific integrated circuit ASIC. Thus, it is possible to reduce manufacturing cost of the receiving circuit or the like.

Example embodiments may be usefully used in a process of manufacturing a semiconductor integrated circuit (IC) and/or a semiconductor device, and in particular, it may be usefully used in an inspection process for detecting whether defects exist in the semiconductor IC and/or the semiconductor device during a process of mass-producing the semiconductor IC and/or the semiconductor device.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A receiver compatible with a mobile industry processor interface (MIPI) C-PHY physical layer, said receiver comprising:
a plurality of variable-gain amplifiers responsive to respective multi-level signals;
a plurality of filters having independently controllable cutoff frequencies, said plurality of filters responsive to respective signals generated by said plurality of amplifiers; a branch circuit configured to generate at least a respective pair of branch signals from each of a plurality of filtering signals generated by the plurality of filters; an array of comparators responsive to the branch signals generated by said branch circuit, said array of comparators comprising a first comparator configured to compare a first one of a first pair of branch signals derived from a first of the plurality of filters to a first one of a second pair of branch signals derived from a second of the plurality of filters, and a second comparator configured to compare a second one of the first pair of branch signals to a first one of a third pair of branch signals derived from a third of the plurality of filters; and a jitter detection circuit, which is configured to set respective gains of the plurality of variable-gain amplifiers and respective cutoff frequencies of the plurality of filters, in response to detecting time-fluctuating jitter in feedback signals derived from output terminals of said array of comparators including the first and second comparators.

2. The receiver of claim 1, wherein the first of the plurality of filters is a high pass filter having a variable impedance element therein, and the variable-gain amplifiers generate differential output signals at corresponding differential output terminals.

3. The receiver of claim 2, wherein the high pass filter comprises a parallel RC network having a variable resistor and a variable capacitor therein, which are responsive to output signals generated by the jitter detection circuit.

4. The receiver of claim 2, wherein the jitter detection circuit is further configured to set the gains of the plurality of variable-gain amplifiers and set the cutoff frequencies of the plurality of filters based on an equalization coefficient, which is: (i) generated by a processor configured to receive jitter information from the jitter detection circuit, and (ii) provided by the processor as feedback to the jitter detection circuit.

5. The receiver of claim 1, further comprising:
first, second and third low power mode comparators responsive to output signals generated at differential output terminals of respective first, second and third ones of the plurality of variable-gain differential amplifiers.

* * * * *